US012675749B2

(12) United States Patent
Ohsaka et al.

(10) Patent No.: US 12,675,749 B2
(45) Date of Patent: Jul. 7, 2026

(54) INFORMATION PROCESSING DEVICE, CONTROL METHOD, AND STORAGE MEDIUM

(71) Applicant: NEC Corporation, Tokyo (JP)

(72) Inventors: Naoto Ohsaka, Tokyo (JP); Tatsuya Matsuoka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 38 days.

(21) Appl. No.: 18/708,720

(22) PCT Filed: Mar. 18, 2022

(86) PCT No.: PCT/JP2022/012764
§ 371 (c)(1),
(2) Date: May 9, 2024

(87) PCT Pub. No.: WO2023/175947
PCT Pub. Date: Sep. 21, 2023

(65) Prior Publication Data
US 2025/0013935 A1      Jan. 9, 2025

(51) Int. Cl.
*G06Q 10/04*          (2023.01)

(52) U.S. Cl.
CPC .................................... *G06Q 10/04* (2013.01)

(58) Field of Classification Search
CPC .............................. G06Q 10/04; G06Q 10/047
See application file for complete search history.

(56) References Cited

U.S. PATENT DOCUMENTS

| | | | |
|---|---|---|---|
| 5,945,982 A | 8/1999 | Higashio et al. | |
| 2003/0158824 A1 | 8/2003 | Aisu | |

| | | | | |
|---|---|---|---|---|
| 2008/0270331 A1* | 10/2008 | Taylor | .................... | G06N 3/126 706/13 |
| 2019/0050730 A1 | 2/2019 | Takamatsu et al. | | |
| 2019/0258751 A1 | 8/2019 | Nishio | | |
| 2023/0169141 A1* | 6/2023 | Tamura | .................... | G06F 17/11 708/200 |

FOREIGN PATENT DOCUMENTS

| | | |
|---|---|---|
| JP | H08-329099 A | 12/1996 |
| JP | 2019-144705 A | 8/2019 |
| JP | 2019-207482 A | 12/2019 |
| JP | 2020-201781 A | 12/2020 |
| WO | 2002/027575 A1 | 4/2002 |
| WO | 2017/175434 A1 | 10/2017 |
| WO | 2021/001977 A1 | 1/2021 |

OTHER PUBLICATIONS

Huang, Lingying, et al. "Branch and bound in mixed integer linear programming problems: A survey of techniques and trends." arXiv preprint arXiv:2111.06257 (2021) (Year: 2021).*
International Search Report for PCT Application No. PCT/JP2022/012764, mailed on Jun. 7, 2022.

* cited by examiner

*Primary Examiner* — Michael P Harrington
(74) *Attorney, Agent, or Firm* — Sughrue Mion, PLLC

(57) ABSTRACT

The information processing device 1X mainly includes an acquisition means 16X and a history display means 161X. The acquisition means 16X acquires constraint relaxation history information indicating a history relating to settings of relaxation of a constraint condition in an optimization problem. The history display means 161X displays, on a display device, a graph structure in which each of the settings included in the history is represented by a node, based on the constraint relaxation history information.

8 Claims, 12 Drawing Sheets

100: OPTIMIZATION SYSTEM

FIG. 3

| ID | USER | TIME | COMMENT | CONTENT OF CONST-RAINT RELAXATION | OBJECTIVE FUNCTION VALUE | OPTIMUM SOLUTION |
|---|---|---|---|---|---|---|
| 001 | U1 | 4/1 **** | **** | $1 \leqq x \leqq 11$ <br> $2 \leqq y \leqq 7$ <br> $p_a = 4, p_b = 2$ | 18 | **** |
| 002 | U1 | 4/2 **** | **** | $1 \leqq x \leqq 13$ <br> $2 \leqq y \leqq 7$ <br> $p_a = 4, p_b = 2$ | 20 | **** |
| 003 | U2 | 4/3 **** | **** | $1 \leqq x \leqq 13$ <br> $2 \leqq y \leqq 9$ <br> $p_a = 4, p_b = 2$ | 22 | **** |
| 004 | U1 | 4/3 **** | **** | $1 \leqq x \leqq 15$ <br> $2 \leqq y \leqq 7$ <br> $p_a = 4, p_b = 2$ | 22 | **** |

FIG. 6

| NODE | USER | TIME | COMMENT |
|------|------|------|---------|
| A | U1 | 4/1 **** | **** |
| B | U1 | 4/2 **** | **** |
| C | U2 | 4/3 **** | **** |
| D | U1 | 4/3 **** | **** |

31

30

32 MERGE

33 GENERATE CHILD NODE

34 INDIVIDUAL DISPLAY

35 COMPARISON DISPLAY

| NODE | USER | TIME | COMMENT |
|------|------|------|---------|
| A | U1 | 4/1 **** | **** |
| B | U1 | 4/2 **** | **** |
| C | U2 | 4/3 **** | **** |
| D | U1 | 4/3 **** | **** |
| E | U3 | 4/6 **** | **** |

30

32 MERGE

33 GENERATE CHILD NODE

34 INDIVIDUAL DISPLAY

35 COMPARISON DISPLAY

INFORMATION PROCESSING DEVICE, CONTROL METHOD, AND STORAGE MEDIUM

This application is a National Stage Entry of PCT/JP2022/012764 filed on Mar. 18, 2022, the contents of all of which are incorporated herein by reference, in their entirety.

TECHNICAL FIELD

The present disclosure relates to a technical field of an information processing device, a control method, and a storage medium for performing processing relating to an optimization problem.

BACKGROUND

There is known a system configured to calculate the solution of an optimization problem. For example, Patent Literature 1 discloses an electronic transaction mediation system configured to generate a plurality of candidates for the combination between traders and customers to meet desired trading conditions of both the traders and the customers at the same time. Further, Patent Literature 2 discloses an optimization system capable of performing rematching by changing some terms of transactions after determining (matching) a combination between sellers and buyers to meet the terms of transactions desired by the sellers and the buyers regarding target goods of transactions, such as trading volume and transaction price.

CITATION LIST

Patent Literature

Patent Literature 1: WO2002/027575
Patent Literature 2: WO2021/001977

SUMMARY

Problem to be Solved

When a solution of an optimization problem is obtained by optimization, the solution satisfies formulated constraint conditions. On the other hand, there are cases where the user can accept a solution where some constraint conditions are not strictly satisfied. Therefore, it is convenient to accumulate the history of the trials of settings regarding the relaxation of constraint conditions. This allows the user to refer to the accumulated history information later on.

In view of the issues described above, one object of the present invention is to provide an information processing device, a control method, and a storage medium capable of suitably presenting a setting history of relaxation of a constraint condition.

Means for Solving the Problem

In one mode of the control device, there is provided an information processing device including:
an acquisition means configured to acquire constraint relaxation history information indicating a history relating to settings of relaxation of a constraint condition in an optimization problem; and
a history display means configured to display, on a display device, a graph structure in which each of the settings included in the history is represented by a node, based on the constraint relaxation history information.

In one mode of the control method, there is provided a control method executed by a computer, the control method including:
acquiring constraint relaxation history information indicating a history relating to settings of relaxation of a constraint condition in an optimization problem; and
displaying, on a display device, a graph structure in which each of the settings included in the history is represented by a node, based on the constraint relaxation history information.

In one mode of the storage medium, there is provided a storage medium storing a program executed by a computer, the program causing the computer to:
acquire constraint relaxation history information indicating a history relating to settings of relaxation of a constraint condition in an optimization problem; and
display, on a display device, a graph structure in which each of the settings included in the history is represented by a node, based on the constraint relaxation history information.

Effect

An example advantage according to the present invention is to suitably present a setting history of relaxation of a constraint condition.

BRIEF DESCRIPTION OF THE DRAWINGS

FIG. 3 It is an example of the data structure of constraint relaxation history information.
FIG. 6 It is a display example of a history management screen image.
FIG. 7 It is an example of the display of the history management screen image after the merge.
FIG. 9B is a third display example of the constraint relaxation designation screen image.

EXAMPLE EMBODIMENTS

Hereinafter, example embodiments regarding an information processing device, a control method, and a storage medium will be described with reference to the drawings.

First Example Embodiment (1) System Configuration

Figure 1:
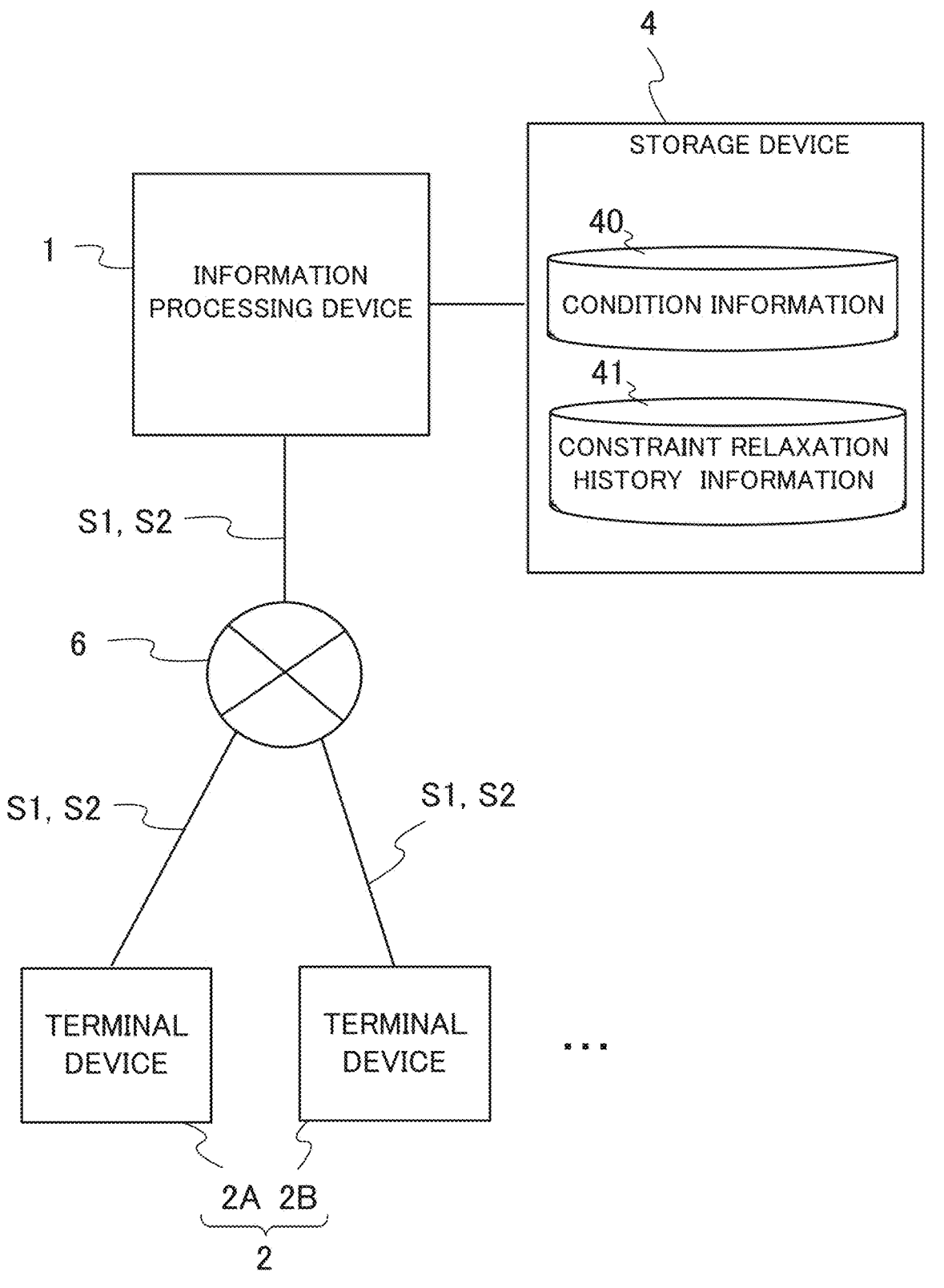
FIG. 1 It illustrates the configuration of an optimization system in a first example embodiment.

FIG. 1 illustrates the configuration of an optimization system 100 according to the first example embodiment. The optimization system 100 mainly includes an information processing device 1, a plurality of terminal devices 2 (2A, 2B, . . . ), and a storage device 4 for storing the condition information 40 and the constraint relaxation history information 41. The information processing device 1 and the terminal device 2 perform data communication with each other via the network 6.

The information processing device 1 functions as a server device that performs data communication with the terminal device 2. Specifically, the information processing device 1 receives the input information S1 relating to a user input from the terminal device 2 through the network 6. The information processing device 1 transmits the display information S2 for executing a predetermined display to the terminal device 2 through the network 6 to the terminal device 2.

The information processing device 1 performs processing relating to optimization in the specified optimization problem. Specifically, the information processing device 1 calculates a solution of the optimization problem based on the condition information 40 and the constraint conditions specified by the input information S1 supplied from the terminal device 2, and updates the constraint relaxation history information 41 based on the calculation result. In this case, the constraint conditions specified by the terminal device 2 represent conditions that are easier than the constraint conditions stored in the condition information 40. Further, based on the settings based on the constraint relaxation history information 41, the information processing device 1 generates display information S2 for displaying the history (also referred to as "constraint relaxation history") relating to the settings of the relaxation of the constraint conditions and the solution, and then transmits the display information S2 to the terminal device 2.

It should be noted that the optimization problem may be, for example, a problem of determining a combination between sellers and buyers regarding target commodities of transaction (and a transportation schedule for the target commodities), a problem of determining a working shift of employees, or any other combination optimization problem. Examples of the commodities described above include a fuel such as LNG, a steel, machinery, electronics, a fiber, a chemical, medical-related goods, food, and any other commodity.

Each terminal device 2 is a terminal usable by a user (decision maker) who performs action based on the solution of the optimization problem. In the present example embodiment, is as an example, there are a plurality of users and each user uses his or her terminal device 2 to browse the constraint relaxation history and specify the relaxation of the constraint conditions. The terminal device 2 transmits the input information S1 generated based on the received user input to the information processing device 1 through the network 6. Here, in the present example embodiment, the terminal device 2 transmits the input information S1 including information (also referred to as "constraint relaxation designation information") specifying the setting of the relaxation of the constraint conditions to the information processing device 1. Examples of the constraint relaxation designation information include information indicating the types of the constraint condition which is allowed to be relaxed, the allowable range of the relaxation, and the weight for a penalty imposed in the case of the relaxation. In addition to the constraint relaxation designation information, the input information S1 may include information (e.g., user ID and comments) regarding the user of the terminal device 2 and time information. Upon receiving the display information S2 from the information processing device 1, the terminal device 2 displays various screen images based on the display information S2.

Here, a supplementary description will be given of the configuration of the terminal device 2. The terminal device 2 includes, for example, an input unit, a display unit, and a communication unit. Examples of the input unit include a keyboard, a touch panel, a button, and a voice input device. Examples of the display unit include a display and a projector. Examples of the communication unit include a network adapter. Examples of the terminal device 2 include a personal computer, a tablet-type terminal, and a PDA (Personal Digital Assistant).

The storage device 4 is one or more memories for storing various information necessary for the optimization process. For example, the storage device 4 stores the condition information and the constraint relaxation history information 41.

The condition information 40 is information on the conditions of the optimization problem to be solved by the information processing device 1 and contains information regarding constraint conditions before the relaxation. For example, if the problem of determining the combination between sellers and buyers regarding the target commodities of transactions is set as an optimization problem to be solved by the information processing device 1, the condition information 40 includes information (including the desired conditions of each seller regarding the place of delivery, delivery period, amount of transactions, and price) regarding the sellers of the target commodities of transactions, information (including the desired conditions of each buyer regarding the place of delivery, delivery period, amount of transactions, and price) regarding the buyers of the target commodities of transactions, and the like.

The constraint relaxation history information 41 is information indicating the constraint relaxation history. For example, it is a database having records each including a previously-defined setting of the relaxation of the constraint conditions and the solution based on the setting. A record is added to the constraint relaxation history information 41 by the information processing device 1 based on a request from the terminal device 2. An example of the data structure of the constraint relaxation history information 41 will be described later.

The storage device 4 may be an external storage device, such as a hard disk, connected to or embedded in the information processing device 1, or may be a storage medium, such as a flash memory. The storage device 4 may be a server device that performs data communication with the information processing device 1. In this case, the storage device 4 may be configured by a plurality of server devices.

The configuration of the optimization system 100 shown in FIG. 1 is an example, and thus various changes may be made to the configuration. For example, although a plurality of terminal devices 2 are provided in FIG. 1, a single terminal device 2 may be provided instead. Further, the information processing device 1 may be configured by a plurality of devices. In this case, the plurality of devices constituting the information processing device 1 performs transmission and reception of information necessary for executing preassigned processing among the plurality of devices. Further, the information processing device 1 and the terminal device 2 may be provided as a single device. The information processing device 1 and the storage device 4 may also be provided as a single device.

(2) Hardware Configuration of Information Processing Device

Figure 2:
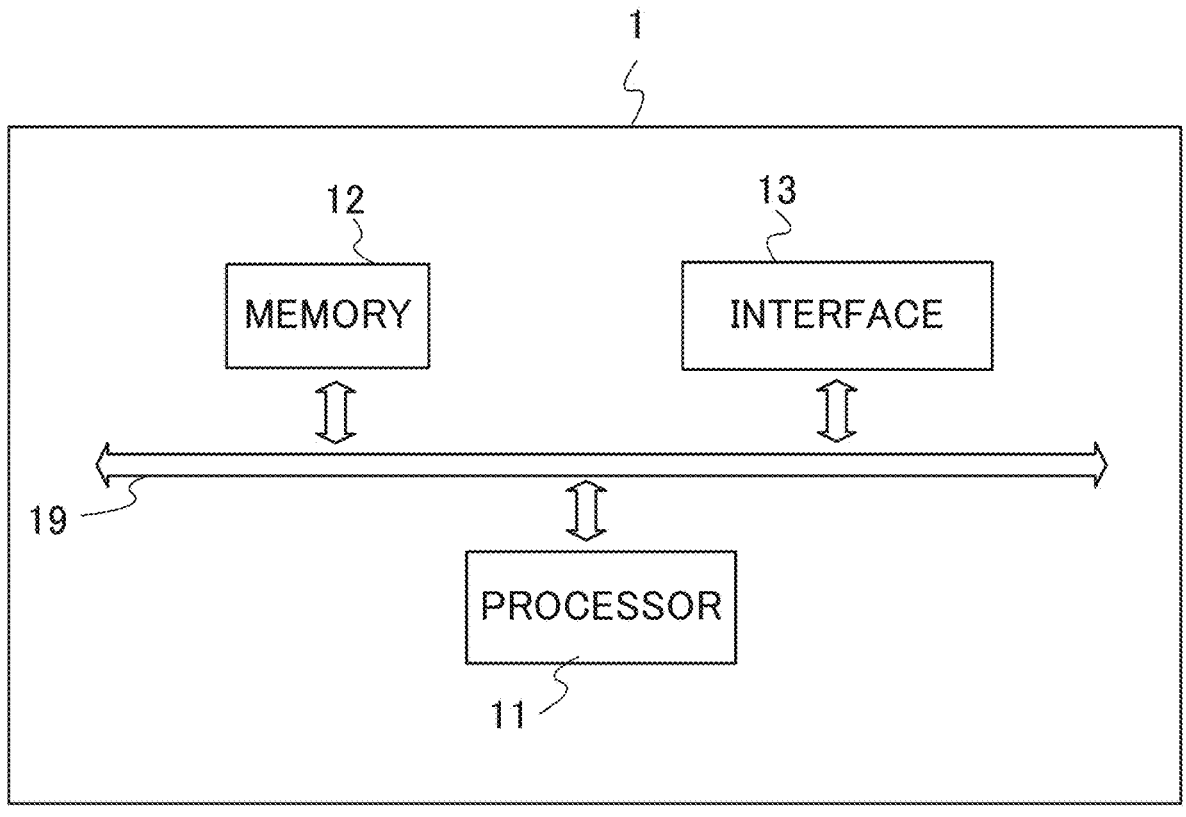
FIG. 2 It illustrates the hardware configuration of the information processing device.

FIG. 2 shows a hardware configuration of the information processing device 1. The information processing device 1 includes a processor 11, a memory 12, and an interface 13 as hardware. The processor 11, the memory 12 and the interface 13 are connected to one another via a data bus 19.

The processor 11 executes a predetermined process by executing a program stored in the memory 12. The processor 11 is one or more processors such as a CPU (Central Processing Unit), a GPU (Graphics Processing Unit), and a TPU (Tensor Processing Unit). The processor 11 may be configured by a plurality of processors. The processor 11 is an example of a computer.

The memory 12 is configured by various volatile memories and non-volatile memories such as a RAM (Random Access Memory) and a ROM (Read Only Memory). Further, a program for the information processing device 1 to execute various kinds of process is stored in the memory 12. The memory 12 is used as a working memory to temporarily store information and the like acquired from the storage device 4. The memory 12 may function as a storage device 4. The storage device 4 may function as the memory 12 of the information processing device 1. The program executed by the information processing device 1 may be stored in a storage medium other than the memory 12.

The interface 13 is one or more interfaces for electrically connecting the information processing device 1 to other devices. Examples of the interfaces include a wireless interface, such as a network adapter, for transmitting and receiving data to and from other devices wirelessly, and a hardware interface, such as a cable, for connecting to other devices.

The hardware configuration of the information processing device 1 is not limited to the configuration shown in FIG. 2. For example, the information processing device 1 may incorporate an input device, a display device, a sound output device, and the like.

(3) Data Structure of Constraint Relaxation History Information

FIG. 3 is an example of the data structure of the constraint relaxation history information 41. The constraint relaxation history information 41 shown in FIG. 3 includes a plurality of records including the items of "ID", "user", "time", "comment", "content of constraint relaxation", "objective function value", and "optimal solution". Each record of the constraint relaxation history information 41 is generated based on the input information S1 supplied from the terminal device 2 to the information processing device 1 and the calculation result of the solution of the optimization problem calculated by the information processing device 1.

The item "ID" indicates the identification data of each record. The item "user" indicates the user identification data (user ID) of the terminal device 2 that sent the input information S1 used to generate the each record. The item "time" indicates the time when the each record was generated. The item "comment" indicates the comment inputted to the terminal device 2 by the user together with the content of relaxation of the constraint conditions.

The item "content of constraint relaxation" indicates the setting of the relaxation of the constraint conditions specified by the user. Here, the item "content of constraint relaxation" includes each relaxed constraint condition and the weight (also referred to as "penalty weight") for the penalty imposed when each constraint condition is relaxed. In the example shown in FIG. 3, "x" (continuous value) and "y" (integer value) are provided as variables to be obtained as a solution in the optimization problem, and the constraint conditions on the variable x and the constraint conditions on the variable y are specified. The "pa" represents the penalty weight for the constraint conditions with respect to the variable x, and the "pb" represents the penalty weight for the constraint conditions with respect to the variable y. The term "penalty weight" herein refers to the degree of penalty imposed when a constraint condition is relaxed, and is used as a coefficient to calculate a penalty value, which is an index value that comprehensively expresses the degree of relaxation of the constraint conditions. The method of calculating the penalty value will be described later.

The item "objective function value" indicates the objective function value for the optimal solution of the optimization problem solved based on the content of the constraint relaxation. The is objective function value refers to the value of the objective function to be maximized or minimized in the optimization. The item "optimal solution" indicates the optimal solution of the optimization problem solved based on the content of the constraint relaxation. In a case where the information processing device 1 calculates a plurality of solutions in accordance with penalty values, plural sets of a solution and an objective function value in accordance with each penalty value may be recorded in the items "optimal solution" and "objective function value" in association with respective penalty values.

Besides, the constraint relaxation history information 41 includes the information necessary for displaying each record as a node by a tree structure. For example, each record of the constraint relaxation history information 41 contains information indicating one or more records having a parent-child relation therewith when displayed by a tree structure.

(4) Functional Blocks

Figure 4:
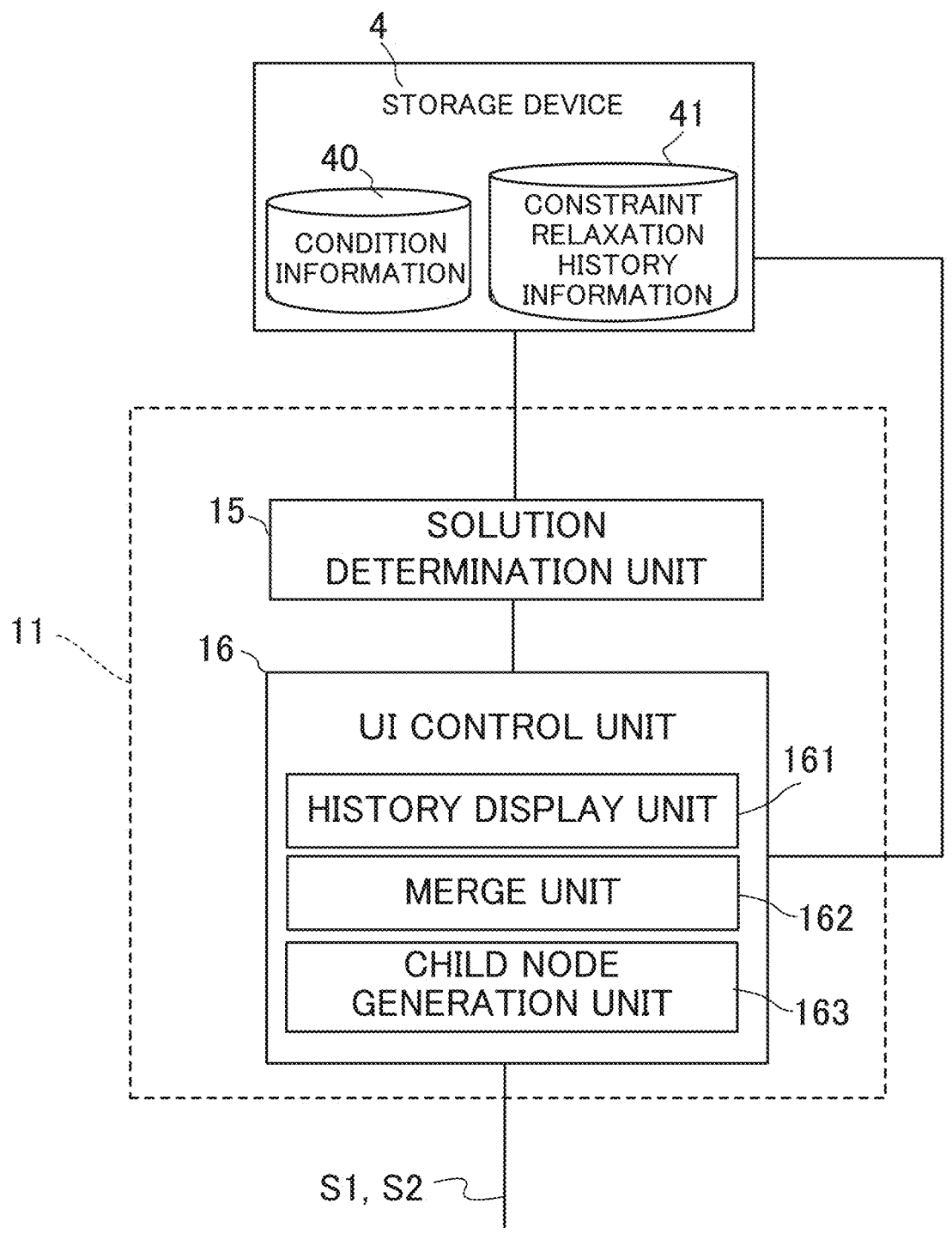
FIG. 4 It is an example of a functional block diagram of a processor relating to an optimization process.

FIG. 4 is an example of functional blocks of the processor 11 relating to the optimization process. The processor 11 functionally includes a solution setting unit 15 and a UI (User Interface) control unit 16. Further, in FIG. 4, any blocks to exchange data with each other are connected by a solid line, but the combinations of the blocks to exchange data with each other are not limited to FIG. 3. The same applies to the drawings of other functional blocks described below.

The solution determination unit 15 determines the solution of the optimization problem based on a request from the UI control unit 16. For example, when the constraint relaxation designation information is supplied from the child node generation unit 163 of the UI control unit 16, the solution determination unit 15 calculates a solution of the optimization problem based on the constraint relaxation designation information and the condition information 40. In this case, the solution determination unit 15 calculates a solution in which the relaxation of the constraint conditions is allowed within the range specified by the constraint relaxation designation information. The solution determination unit 15 may calculate a plurality of optimal solutions while changing the upper limit of the penalty value. The solution determination unit 15 supplies data (also referred to as "solution data") representing the calculation result of the solution of the optimization problem to the UI control unit 16. The solution data includes a set of the obtained solution and the objective function value corresponding to the solution.

The solution determination unit 15 may determine the solution of the optimization problem based on an arbitrary optimization method (optimization solver). For example, when solving a problem of determining a combination of sellers and buyers regarding the target commodities of transactions, the solution determination unit 15 formulates the problem as an integer programming problem by regarding the problem as a single combination optimization is problem. The solution determination unit 15 obtains a solution of the formulated integer programming problem by performing the processing equivalent to a typical application program (e.g., IBM ILOG CPLEX, Gurobi Optimizer, SCIP). A determination method of the sellers, buyers, the ships to be used, and each navigation period of the ships by setting an integer programming problem is, for example, disclosed in Patent Literature 2 and the like.

The UI control unit 16 performs the display control of the terminal device 2 based on the constraint relaxation history information 41, and the updating process of the constraint relaxation history information 41 based on the input information S1 supplied from the terminal device 2. The UI control unit 16 functionally includes a history display unit 161, a merge unit 162, and a child node generation unit 163.

The history display unit 161 performs display control of the terminal device 2 based on the constraint relaxation history information 41. In the display control based on the constraint relaxation history information 41, the history display unit 161 generates the display information S2 for displaying a management screen image (also referred to as "history management screen image") relating to the constraint relaxation history. Then, the history display unit 161 transmits the generated display information S2 to the terminal device 2, to thereby display the history management screen image on the terminal device 2. In the history management screen image, the history display unit 161 displays a tree structure in which each record of the constraint relaxation history information 41 is represented by anode, as will be described later. The display example of the history management screen image will be described later. Instead of displaying the tree structure in which each record of the constraint relaxation history information 41 is represented by a node, the history display unit 161 may display a graph structure other than the tree structure in which each record of the constraint relaxation history information 41 is represented by a node. The graph structure displayed in this case may include a closed circuit when converted to an undirected graph that does not take into account the orientation of branches (arrows) between nodes.

The merge unit 162 receives the input specifying the merge of any two nodes on the history management screen image and, upon receiving the input, it performs the process of generating a node into which the specified two nodes are merged. In this case, the merge unit 162 integrates the constraint conditions corresponding to the two nodes subjected to the merge by logical sum, and generates a record of the constraint relaxation history information 41 based on a solution of the optimization problem determined by the solution determination unit 15 using the constraint conditions after the integration. It is noted that the node generated by the merge is a common child of the specified two nodes.

The child node generation unit 163 receives an input that instructs the generation of a is child node originated from an arbitrary node on the history management screen image, and upon receiving the input, it generates a child node having the origin node as the parent node. In this case, the child node generation unit 163 receives the user's designation relating to the relaxation of the constraint conditions corresponding to the target child node of the generation. For example, the child node generation unit 163 receives a user input that specifies a type of a constraint condition that is allowed to be relaxed, the allowable range of the relaxation (also referred to as "relaxation range"), and the penalty weight. The child node generation unit 163 generates a record of the constraint relaxation history information 41 corresponding to the generated child node on the basis of the solution of the optimization problem calculated by the solution determination unit 15 according to the received constraint condition. A parent node is an example of the "first node", and a child node is an example of the "second node".

Each component of the solution determination unit 15, the history display unit 161, the merge unit 162, and the child node generation unit 163 described in FIG. 4 can be realized, for example, by the processor 11 executing a program. The necessary programs may be recorded on any non-volatile storage medium and installed as necessary to realize each component. It should be noted that at least a portion of these components may be implemented by any combination of hardware, firmware, and software, or the like, without being limited to being implemented by software based on a program. At least some of these components may also be implemented using a user programmable integrated circuit such as a FPGA (Field-Programmable Gate Array) and a microcontroller. In this case, the integrated circuit may be used to realize a program to function as each of the above components. Further, at least some of the components may be realized by ASSP (Application Specific Standard Produce), ASIC (Application Specific Integrated Circuit), or quantum processor (quantum computer control chip). Thus, each component may be implemented by various hardware. The above is also true for other example embodiments described later. Furthermore, each of these components may be implemented by the cooperation of a plurality of computers, for example, using cloud computing technology.

(5) Calculation of Penalty Value Based on Penalty Weight

Next, the method of calculating a penalty value based on a penalty weight will be supplemented with specific examples.

It is herein assumed that "x" (a continuous value), "y" (an integer value), and "z" (a binary value of 0 or 1) are variables to be obtained as a solution in the optimization problem and that the following constraint conditions (a) to (c) are included in the condition information.

$$4 \leqq x \leqq 10 \tag{a}$$

$$3 \leqq y \leqq 5 \tag{b}$$

$$z = 0 \tag{c}$$

It is also assumed that the objective function is set to the sum (x+y+z) of x, y, and z as follows, and the determination of the solution (x, y, z) of the optimization is made so that the objective function value is maximized or minimized (herein, maximized).

$$\max (x + y + z)$$

Then, the constraint conditions (a) to (c) are assumed to be relaxed into the following constraint conditions (a1) to (c1), respectively.

$$1 \leq x \leq 13 \tag{a1}$$

$$2 \leq y \leq 7 \tag{b1}$$

$$z = 0 \text{ or } 1 \tag{c1}$$

It is also assumed that penalty weights "pa," "pb," and "pc" are set for the constraint conditions (a) to (c), respectively.

pa=4
pb=2
pc=10

In this situation, the penalty weights pa to pc are factors used in determining the penalty value. For example, the determined solution is multiplied by the degree of deviation (degree of violation) from the original constraint conditions (a) to (c). Then, the total value of the multiplication values obtained by multiplying the degree of deviation by the corresponding penalty weight for each constraint condition is calculated as the penalty value.

Figure 5:
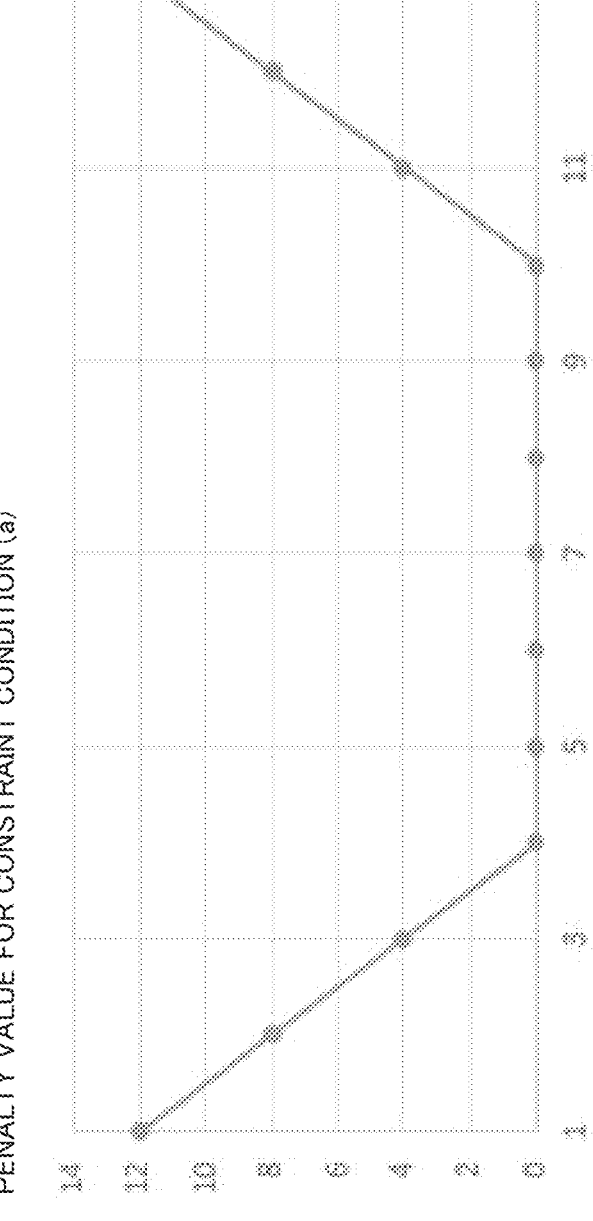
FIG. 5 It is a graph showing the relation between a variable x and the penalty value for a constraint condition (a).

FIG. 5 is a graph showing the relation between the variable x and the penalty value for the constraint condition (a). As shown in FIG. 5, the penalty value for the constraint condition (a) becomes 0 as long as the constraint condition (a) is satisfied. On the other hand, if the variable x is within such a range (i.e., relaxation range) that the constraint condition (a) is not satisfied and the condition (a1) is satisfied, the penalty value increases according to the penalty weight pa with increasing distance from the constraint condition (a) (i.e., with increasing degree of deviation).

For example, if the solution is (x, y, z)=(8, 4, 0), the penalty value is 0. On the other hand, if the solution is (x, y, z)=(13, 2, 1), the penalty value is $$(13 - 10) * pa + (3 - 2) \cdot pb + (1 - 0) * pc = 24.$$

It is noted that (x, y, z)=(15, 5, 0) is excluded from the candidates for the solution because none of the constraint condition (a) and the condition (a1) after the relaxation is not satisfied (i.e., it does not belong to neither the initial range nor relaxation range). A predetermined upper limit value of the penalty value may be provided. In this case, the solution determination unit 15 calculates a solution of the optimization problem that the objective function value is the maximum or minimum in the range where the penalty value does not exceed the predetermined upper limit value.

(6) Display Example

Next, a description will be given of the history management screen image which the history display unit 161 causes a terminal device 2 to display based on the constraint relaxation history information 41. FIG. 6 is a display example of the history management screen image. Upon receiving the display request of the history management screen image from a terminal device 2, the history display unit 161 transmits the display information S2 generated on the basis of the constraint relaxation history information 41 to the terminal device 2 via the interface 13, to thereby cause the terminal device 2 to display the history management screen image.

The history management screen image includes a constraint relaxation history tree 30, a constraint relaxation history table 31, a merge execution button 32, a child node generation button 33, an individual display button 34, and a comparison display button 35.

The constraint relaxation history tree 30 is a tree structure with each record of the constraint relaxation history information 41 as a node. Each of the nodes A to D can be selected by clicking on the history management screen image or the like. In the example shown in FIG. 6, the nodes C and D are highlighted because they are in the selected state. Here, the node A is a root node and represents the firstly-generated record of the constraint relaxation history information 41. The node B is a child node of the node A and represents a record originated from the node A. The nodes C and D are child and leaf nodes of the node B, and represent records originated from node B, respectively. Thus, the history display unit 161 expresses the relation among records of the constraint relaxation history information 41 as a constraint relaxation history tree 30 by a tree structure. This allows the user to visually recognize the relation among the records of the constraint relaxation history information 41.

The constraint relaxation history table 31 is a table representing the records of the constraint relaxation history information 41 corresponding to respective nodes of the constraint relaxation history tree 30. Here, the records of the constraint relaxation history information 41 in which the item "ID" in FIG. 3 ranges from 001 to 004 are displayed as records corresponding to nodes A to D. In the example shown in FIG. 6, some items such as the content of constraint relaxation included in the constraint relaxation history information 41 are hidden for convenience of a display space and the like. However, these items may also be included in the constraint relaxation history table 31.

The merge execution button 32 is a button for instructing the execution of the merge of the two selected nodes. Upon detecting that the merge execution button 32 is selected, the merge execution unit 162 supplies an optimization execution request including the content of the constraint relaxation obtained by merging the contents of the constraint relaxation recorded in the records of the constraint relaxation history information 41 represented by the two selected nodes to the solution decision unit 15. Then, the solution determination unit 15 calculates the solution of the optimization problem based on the content of the constraint relaxation specified in the optimization execution request. Then, the merge unit 162 adds a record indicating the calculation result of the solution by the solution determination unit 15 and the merged content of the constraint relaxation to the constraint relaxation history information 41. The history display unit 161 displays on the history management screen image the constraint relaxation history tree 30 and the constraint relaxation history table 31 in which the node generated by the merge is reflected.

Here, the merge of the contents of the constraint relaxation will be supplemented. In merging the contents of the constraint relaxation, the integration of constraint conditions by the logical sum (OR) is carried out with respect to each type of constraint conditions. For example, regarding the constraint conditions relating to the variable x (continuous value), if one content of the constraint relaxation indicates "2≤x≤5" and another content of the constraint relaxation indicates "4≤x≤7", the merged content of the constraint relaxation will indicate 2≤x≤7". In another example, regarding the constraint conditions relating to the variable y (integer value), if one content of the constraint relaxation indicates "5≤y" and another content of the constraint relaxation indicates "3≤y", the merged content of the constraint relaxation will indicate "3≤y". In this way, in merging the contents of the constraint relaxation, the constraint condition after the merge is set with respect to each type of constraint condition to satisfy at least one of the two contents of the constraint relaxation to be merged.

The child node generation button 33 is a button for instructing the addition of a node originated from an arbitrary node. Upon detecting the selection of the child node generation button 33 while an arbitrary node is selected, the child node generation unit 163 generates a node originated from the node in the selected state. In this case, the child node generation unit 163 firstly displays a screen image for receiving the designation of the content of the constraint relaxation for the target node of generation, and then receives the input information S1 including the constraint relaxation designation information from the terminal device 2. The solution determination unit 15 calculates the solution of the optimization problem based on the content of the constraint relaxation indicated by the constraint relaxation designation information, and the child node generation unit 163 adds a record of the constraint relaxation history information 41 corresponding to the target node of generation based on the calculation result of the solution determination unit 15 or the like. In this case, for example, the new record includes information specifying the node, which was selected to be the origin point, as the parent node. Thereafter, the history display unit 161 displays the constraint relaxation history tree 30 and the constraint relaxation history table 31 in which the generated node is reflected.

The individual display button 34 is a button that requests a detailed display of a record of the constraint relaxation history information 41 corresponding to a selected single node. Upon detecting that the individual display button 34 is selected, the history display unit 161 displays information, such as the content of the constraint relaxation and the solution, based on the record of the constraint relaxation history information 41 corresponding to the selected node on the history management screen image. The comparison display button 35 is a button for requesting the comparison display of two records of the constraint relaxation history information 41 corresponding to selected two nodes. Upon detecting that the individual display button 34 is selected, the history display unit 161 displays on the history management screen image information for comparing the contents of the constraint relaxation of the two records of the constraint relaxation history information 41 corresponding to the selected two nodes.

FIG. 7 is a display example of a history management screen image after the merge. Here, a new node E is generated by merging nodes C and D by selecting the merge execution button 32 with the nodes C and D selected.

In this case, the history display unit 161 considers the new record of the constraint relaxation history information 41 generated by the merge as the node E, and displays the constraint relaxation history tree 30 and the constraint relaxation history table 31 which include the node E on the history management screen image. Here, the history display unit 161 displays the node E as a common child node of the node C and the node D used for the merge in the constraint relaxation history tree 30. Further, in the constraint relaxation history table 31, the history display unit 161 displays the record of the constraint relaxation history table 31 for the node E based on the new record of the constraint relaxation history information 41 generated by the merge. After the merge execution button 32 is selected, the solution determination unit 15 calculates the solution of the optimization problem based on the content of the constraint relaxation obtained by merging the contents of the constraint relaxation corresponding to the node C and the node D, and the merge unit 162 generates a record of the constraint relaxation history information 41 corresponding to the node E based on the calculation result of the solution or the like.

As described above, the information processing device 1 can receive the designation of the merge of any two nodes on the history management screen image and display the constraint relaxation history tree 30 and the constraint relaxation history table 31 in which a new node generated by the merge is reflected. In addition, the user of the terminal device 2 can suitably confirm the history of the transition of the constraint relaxation including the merge on the history management screen image.

The history display unit 161 may display the nodes of the constraint relaxation history tree 30 in a color-coded manner for each user. Similarly, the history display unit 161 may display is the records of the constraint relaxation history table 31 in a color-coded manner for each user. In addition, each user may be associated with privilege information indicating whether or not the user can give the merge execution instruction and whether or not the user can give the execution instruction to add a child node and the like. Such privilege information is, for example, previously stored in the storage device 4 or the like.

Figure 8:
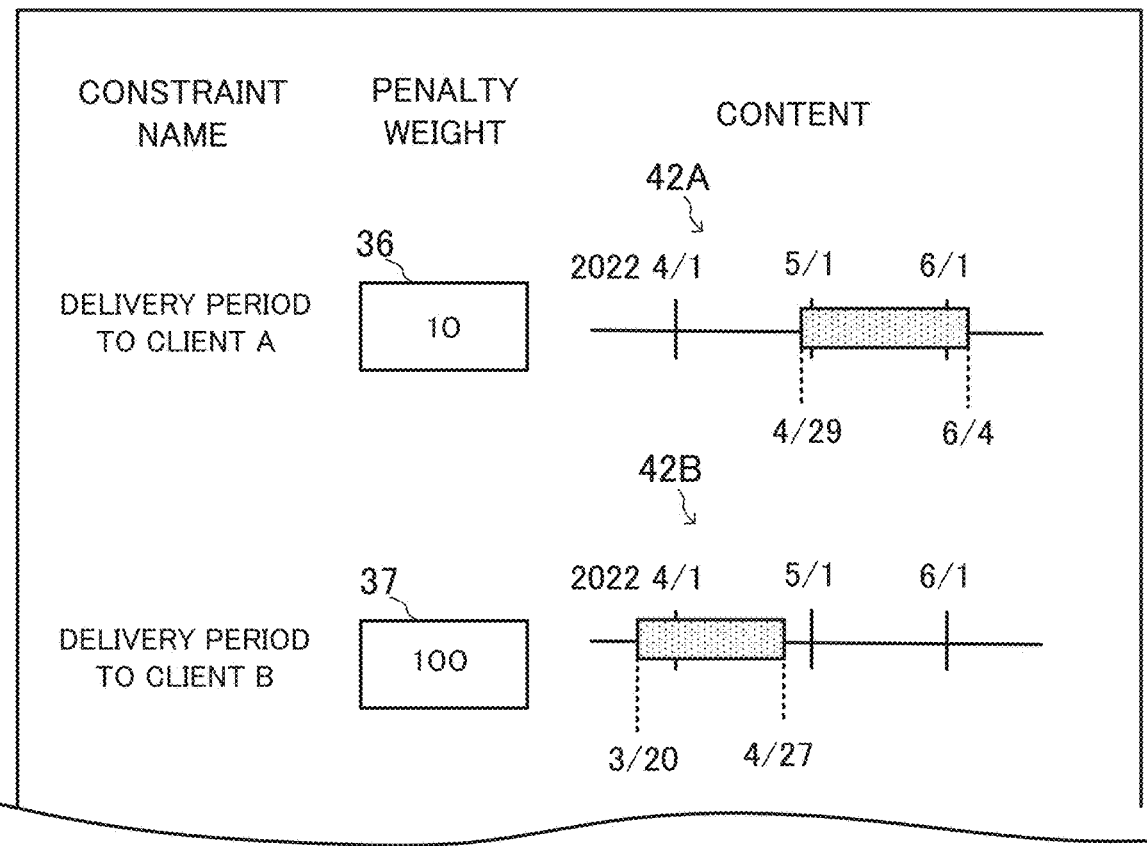
FIG. 8 It is a first display example of the constraint relaxation designation screen image.

FIG. 8 is a first display example of an input screen image (also referred to as "constraint relaxation designation screen image"), for specifying the content of the constraint relaxation, which is displayed when the child node generation button 33 is selected in FIG. 6. The first display example shows a display example when each constraint condition to be possibly relaxed is identified by a continuous range such as a period of time.

The child node generation unit 163 generates the display information S2 for displaying the constraint relaxation designation screen image, and transmits the generated display information S2 to the terminal device 2 via the interface 13 to display the constraint relaxation designation screen image to the terminal device 2.

The constraint relaxation designation screen image relating to the first display example includes display fields corresponding to each item of "constraint name", "penalty weight", and "content". The item "constraint name" indicates the name of a constraint condition (in other words, a constraint condition that can be relaxed) that is a candidate for the condition to be relaxed. Here, "delivery period to client A" and "delivery period to client B" are listed in the display field of the item "constraint name".

The item "penalty weight" indicates the penalty weight to be set for the constraint condition having the constraint name displayed in the display field of the item "constraint name", and the weight designation fields 36 and 37 are provided in the display field of the item "penalty weight". The weight designation fields 36 and 37 each is an input field where the user can specify any numerical value of the penalty weight by the terminal device 2. In the weight designation fields 36 and 37, penalty weights based on the item "content of constraint relaxation" of the record of the constraint relaxation history information 41 corresponding to the node selected as the origin point are displayed as initial values.

In the field of the item "content", graphs 42A and 42B showing the contents of the constraint conditions having the constraint names displayed in the display field of the item "constraint name", respectively. The graphs 42A and 42B in the initial state each represents, by a gauge, the content of the constraint condition according to the item "content of constraint relaxation" of the record of the constraint relaxation history information 41 corresponding to the node selected as the origin point. The child node generation unit 163 receives any modification of the ranges indicated by the gages on the graphs 42A and 42B based on a user input. For example, the child node generation unit 163 receives the modification of the range indicated by the gauge by detecting an operation of dragging and dropping the right end or the left end of the initial range to a position corresponding to an acceptable date or the like.

Upon detecting that a button (not shown) for instructing completion of input is selected in the constraint relaxation designation screen image or the like, the child node generation unit 163 receives the constraint relaxation designation information indicating the latest contents of the items "penalty weight" and "content" in the constraint relaxation designation screen image from the terminal device 2. Then, the solution determination unit 15 calculates a solution of the optimization problem based on the constraint relaxation designation information and adds a record of the constraint relaxation history information 41 corresponding to the generated child node based on the calculation result of the solution and the constraint relaxation designation information. Further, the history display unit 161 reflects a new node whose parent node is the node selected to be the origin point in the display of the constraint relaxation history tree 30 and the constraint relaxation history table 31 on the history management screen image.

Figure 9A:
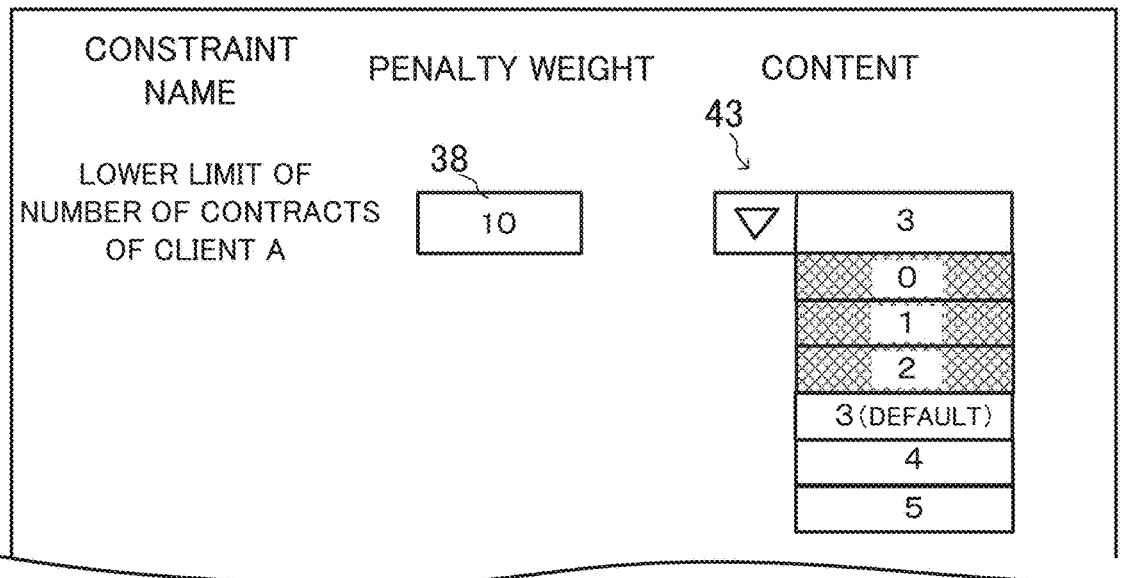
FIGS. 9A and 9B FIG. 9A is a second display example of the constraint relaxation designation screen image.

FIG. 9A is a second display example of the constraint relaxation designation screen image. The second display example is a display example in which a constraint condition to be possibly relaxed is identified by discrete numerical values.

In the second display example, "lower limit of number of contracts of client A" is displayed in the display field of the item "constraint name". In the display field of the item "penal weight" there is provided a weight designation field 38 which is an input field of the penal weight to be set for the constraint condition "lower limit of number of contracts of client A". In addition, in the display field of the item "content", there is provided a condition designation field 43 which is an input field for specifying the setting of the above-described constraint condition.

The condition designation field 43 is an input field according to a pull-down menu format as an example, and displays values (discrete values) settable as a lower limit of the number of contracts of the client A in a selectable manner. In the condition designation field 43 in the initial state, the initial value "3" is set based on the item "content of constraint relaxation" of the record of the constraint relaxation history information 41 corresponding to the node selected as the origin point. Further, in the condition designation field 43, the menus indicating the values "0", "1", and "2" which are easier constraints than the initial value (herein 3) are highlighted. For example, if "1" is selected in the relaxation range designation field 43, such a case where the number of the contracts of the client A is once or twice will be additional allowed.

Figure 9B:
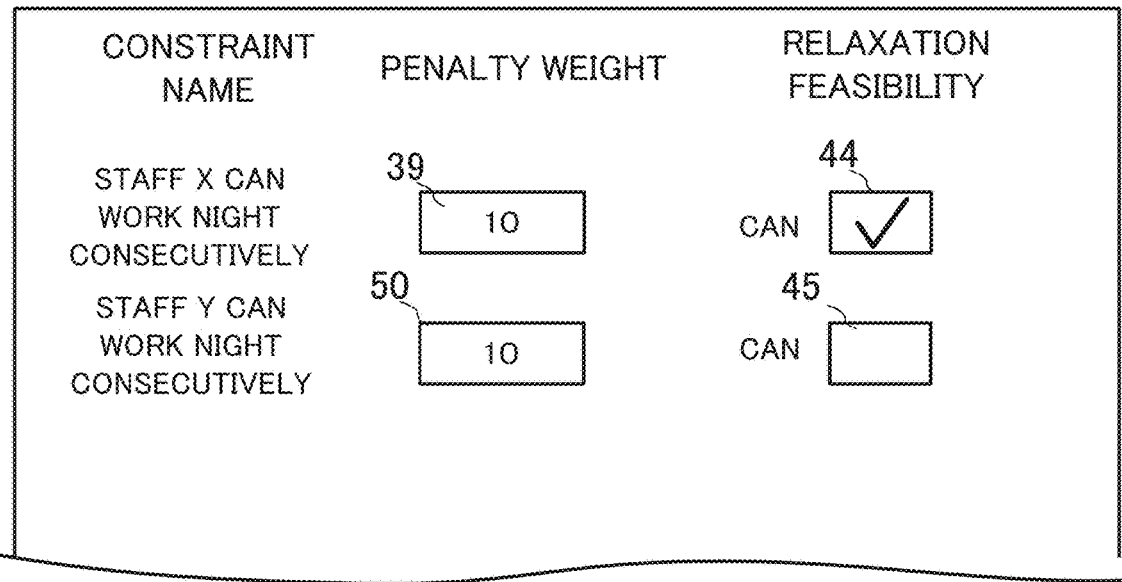

FIG. 9B is a third display example of the constraint relaxation designation screen image. The third display example is a display example in which whether or not each constraint condition to be possibly relaxed can be excluded is specified.

In the third display example, there are listed "staff X can work night consecutively" and "staff Y can work night consecutively" in the display field of the item "constraint name". In the display field of the item "penalty weight", there are provided weight designation fields 39 and 50 each of which is an input field of a penalty weight to be set for each constraint condition. Further, in the display field of the item "relaxation feasibility", there are provided checkboxes 44 and 45 as input fields each for specifying whether or not the relaxation (herein exclusion) of each constraint condition described above is feasible. In the initial state, the check box 44 is checked and the check box 45 is not checked based on the "content of constraint relaxation" of the record of the constraint relaxation history information 41 corresponding to the node selected as the origin point.

As described above, the child node generation unit 163 can display, as the initial value, the content of the constraint relaxation based on the record of the constraint relaxation history information 41 corresponding to the node serving as the origin point and suitably receive the designation of the penalty weight and the content relating to the constraint condition corresponding to the child node to be generated.

(7) Processing Flow

Figure 10:
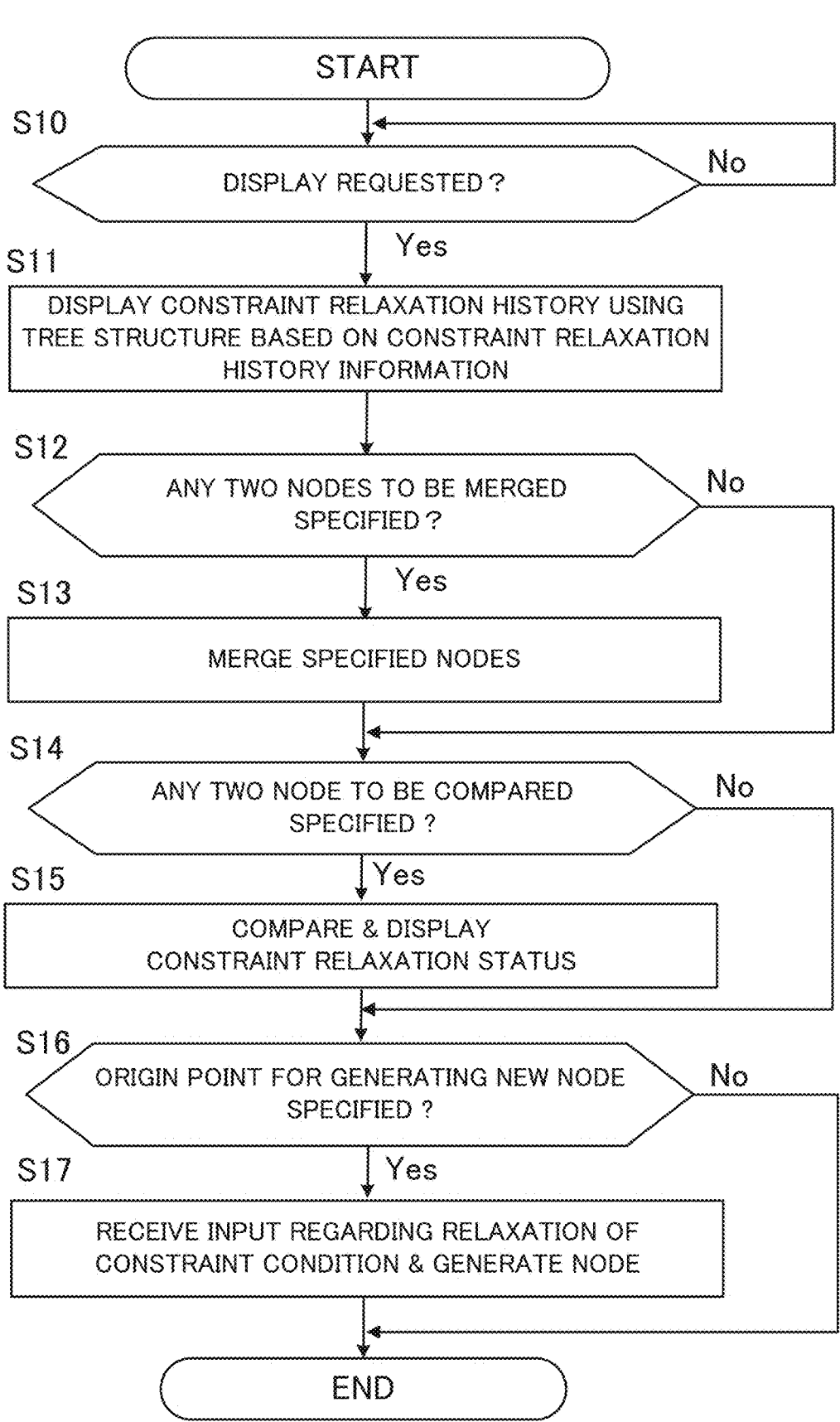
FIG. 10 It is an example of a flowchart in the first example embodiment.

FIG. 10 is an example of a flowchart that is executed by the information processing device 1 according to the first example embodiment.

First, the information processing device 1 determines whether or not the information processing device 1 has received, from any terminal device 2, a display request for requesting the display of the constraint relaxation history, which is a history relating to the settings of the relaxation of constraint conditions and the solutions based on the settings (step S10). Upon receiving the display request from a terminal device 2 (step S10; Yes), the information processing device 1 generates the display information S2 for displaying the constraint relaxation history using a tree structure on the basis of the constraint relaxation history information 41. Then, the information processing device 1 transmits the display information S2 to the terminal device 2 to display the constraint relaxation history on the terminal device 2 using a tree structure (step S11). In this case, for example, the information processing device 1 causes the terminal device 2 to display the history management screen image shown in FIG. 6 or the like. On the other hand, if the information processing device 1 has not received the above-described display request from any terminal device 2 yet (step S10; No), it executes the process at step S10 continuously.

Next, the information processing device 1 determines whether or not any two nodes to be merged in the displayed tree structure are specified (step S12). In this case, the information processing device 1 determines whether or not the two nodes are specified based on the input information S1 received from the terminal device 2. Then, upon determining that any two nodes have been specified (step S12; Yes), the information processing device 1 merges the specified two is nodes (step S13). In this case, the information processing device 1 generates a record of the constraint relaxation history information 41 corresponding to the new node into which the contents of the constraint relaxation of the specified two nodes are integrated, and displays the above-described tree structure in which the new node is reflected on the terminal device 2. On the other hand, upon determining that any two nodes have not been specified (step S12; No), the information processing device 1 proceeds with the process at step S14.

Next, the information processing device 1 determines whether or not any two nodes to be compared are specified in the displayed tree structure (step S14). Then, upon determining that any two nodes to be compared are specified (step S14; Yes), the information processing device 1 provides the comparison display of the contents of the constraint relaxation corresponding to the specified two nodes on the terminal device 2 (step S15). In this case, the information processing device 1 generates the display information S2 for displaying the contents of the constraint relaxation of the specified two nodes in a comparative manner, on the basis of a records of the constraint relaxation history information 41 corresponding to the specified two nodes, and supplies the display information S2 to the terminal device 2. On the other hand, upon determining that any two nodes to be compared are not specified (step S14; No), the information processing device 1 proceeds with the process at step S16.

Next, the information processing device 1 determines whether or not a node to be an origin point for generating anew node has been specified (step S16). Upon determining that the node to be an origin point for generating a new node has been specified (step S16; Yes), the information processing device 1 receives the input relating to relaxation of the constraint conditions and generates the node based on the received input (step S17). In this case, the information processing device 1 causes the terminal device 2 to display the constraint relaxation designation screen image for receiving the content of the constraint relaxation of the new node using the content of the constraint relaxation of the specified node as its initial value. The information processing device 1 generates a record of the constraint relaxation history information 41 corresponding to the new node based on the input information specified on the constraint relaxation designation screen image and causes the terminal device 2 to display the above-described tree structure in which the new node is reflected.

A supplementary explanation is given herein on the effect of relaxation of constraint conditions. For example, when a decision maker in transactions uses this system, the decision maker refers to the history management screen image or the like in the middle of the decision making to grasp the relaxation state of the constraint conditions, which enables the decision maker to obtain materials of negotiation for affecting the transaction partner. In another example, it may lead to an improvement in the objective function value as compared to the case where a single is optimization is performed without relaxing constraint conditions. In yet another example, when a feasible solution is not found (a solution cannot be found) in the optimization by the solution determination unit 15, the feasible solution can be obtained by including the relaxation of the constraint conditions in the options.

Second Example Embodiment

Figure 11:
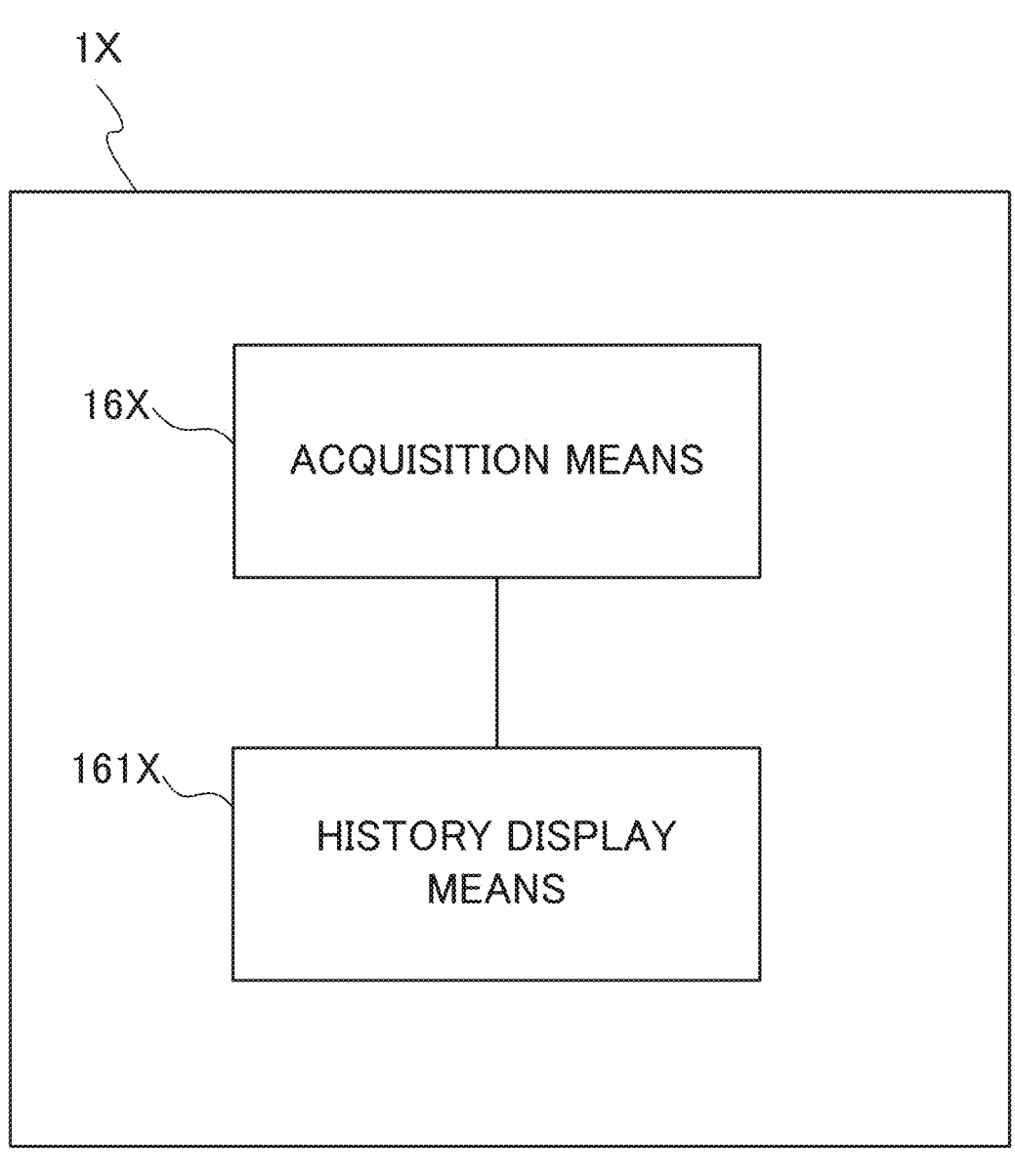
FIG. 11 It is a functional block diagram of an information processing device according to the second example embodiment.

FIG. 11 is a functional block diagram of an information processing device 1X according to a second example embodiment. The information processing device 1X mainly includes an acquisition means 16X and a history display means 161X. The information processing device 1X may be configured by a plurality of devices.

The acquisition means 16X is configured to acquire constraint relaxation history information indicating a history relating to settings of relaxation of a constraint condition in an optimization problem. Examples of the acquisition means 16X include the UI control unit 16 which acquires the constraint relaxation history information 41 stored in the storage device 4 according to the first example embodiment.

The history display means 161X is configured to display, on a display device, a graph structure in which each of the settings included in the history is represented by a node, based on the constraint relaxation history information. The display device may be a device (e.g., the terminal device 2) separate from the information processing device 1X or may be incorporated in the information processing device 1X. Examples of the history display means 161X include the history display unit 161 according to the first example embodiment.

Figure 12:
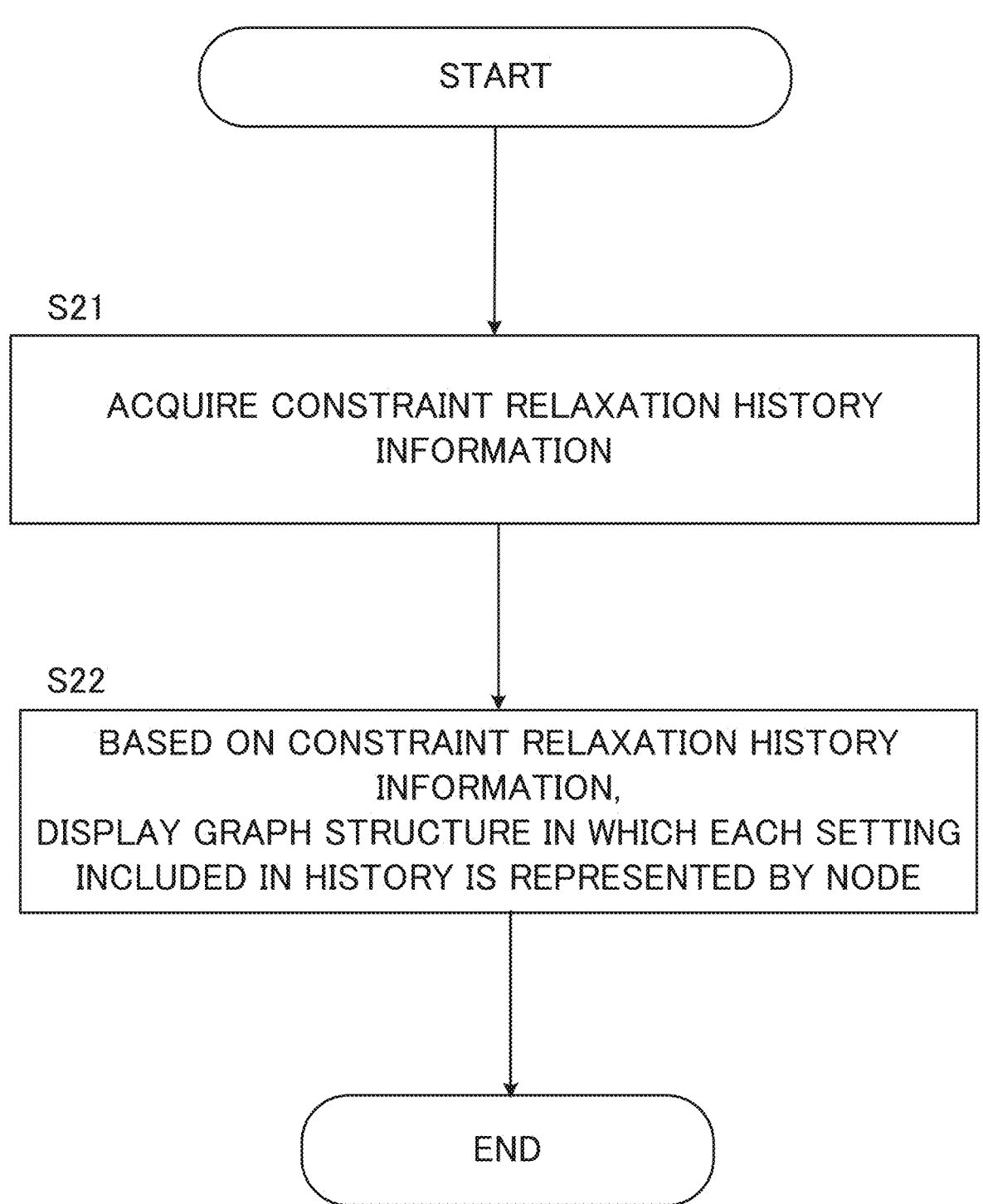
FIG. 12 It is an example of a flowchart in the second example embodiment.

FIG. 12 is an exemplary flowchart that is executed by the information processing device 1X in the second example embodiment. First, the acquisition means 16X acquires constraint relaxation history information indicating a history relating to settings of relaxation of a constraint condition in an optimization problem (step S21). Then, the history display means 161X displays, on a display device, a graph structure in which each of the settings included in the history is represented by a node, based on the constraint relaxation history information (step S22).

The information processing device 1X according to the second example embodiment can display the history of the relaxation of the constraint condition in the optimization problem in an intuitively and easily understandable manner.

The whole or a part of the example embodiments described above (including modifications, the same applies hereinafter) can be described as, but not limited to, the following Supplementary Notes.

[Supplementary Note 1]

An information processing device comprising:

an acquisition means configured to acquire constraint relaxation history information is indicating a history relating to settings of relaxation of a constraint condition in an optimization problem; and a history display means configured to display, on a display device, a graph structure in which each of the settings included in the history is represented by a node, based on the constraint relaxation history information.

[Supplementary Note 2]

The information processing device according to Supplementary Note 1, further comprising a merge means configured to receive an input for specifying two nodes to be merged from the node and add a node to the graph structure obtained by merging the two nodes, upon receiving the input.

[Supplementary Note 3]

The information processing device according to Supplementary Note 2, wherein the merge means is configured to determine a constraint condition corresponding to the node added by the merge, based on a logical sum of constraint conditions corresponding to the two nodes.

[Supplementary Note 4]

The information processing device according to any one of Supplementary Notes 1 to 3, further comprising anode generation means configured to receive an input for specifying a node to be an origin point among the node and generate a second node whose first node is the node specified to be the origin point in the graph structure, upon receiving the input.

[Supplementary Note 5]

The information processing device according to Supplementary Note 4, wherein the node generation means is configured to receive an input relating to a type of the constraint condition which is allowed to be relaxed, a relaxation range of the constraint condition, and the weight for a penalty when the constraint condition is relaxed, and generate the constraint relaxation history information relating to the second node based on the input.

[Supplementary Note 6]

The information processing device according to any one of Supplementary Notes 1 to 5, wherein the history display means is configured to receive an input for specifying two nodes to be compared among the nodes, and compare and display the settings corresponding to the two nodes on the display device, upon receiving the input.

[Supplementary Note 7]

The information processing device according to any one of Supplementary Notes 1 to 6, wherein the constraint relaxation history information includes information on solutions of the optimization problem calculated based on the settings.

[Supplementary Note 8]

The information processing device according to any one of Supplementary Notes 1 to 7, further comprising a solution determination means configured to determine, when a node is added, a solution of the optimization problem based on the setting corresponding to the added node.

[Supplementary Note 9]

A control method executed by a computer, the control method comprising:

acquiring constraint relaxation history information indicating a history relating to settings of relaxation of a constraint condition in an optimization problem; and displaying, on a display device, a graph structure in which each of the settings included in the history is represented by a node, based on the constraint relaxation history information.

[Supplementary Note 10]

A storage medium storing a program executed by a computer, the program causing the computer to:

acquire constraint relaxation history information indicating a history relating to settings of relaxation of a constraint condition in an optimization problem; and display, on a display device, a graph structure in which each of the settings included in the history is represented by a node, based on the constraint relaxation history information.

In the example embodiments described above, the program is stored by any type of a non-transitory computer-readable medium (non-transitory computer readable medium) and can be supplied to a processor or the like that is a computer. The non-transitory computer-readable medium include any type of a tangible storage medium. Examples of the non-transitory computer readable medium include a magnetic storage medium (e.g., a flexible disk, a magnetic tape, a hard disk drive), a magnetic-optical storage medium (e.g., a magnetic optical disk), CD-ROM (Read Only Memory), CD-R, CD-R/W, a solid-state memory (e.g., a mask ROM, a PROM (Programmable ROM), an EPROM (Erasable PROM), a flash ROM, a RAM (Random Access Memory)). The program may also be provided to the computer by any type of a transitory computer readable medium. Examples of the transitory computer readable medium include an is electrical signal, an optical signal, and an electromagnetic wave. The transitory computer readable medium can provide the program to the computer through a wired channel such as wires and optical fibers or a wireless channel.

While the invention has been particularly shown and described with reference to example embodiments thereof, the invention is not limited to these example embodiments. It will be understood by those of ordinary skilled in the art that various changes in form and details may be made therein without departing from the spirit and scope of the present invention as defined by the claims. In other words, it is needless to say that the present invention includes various modifications that could be made by a person skilled in the art according to the entire disclosure including the scope of the claims, and the technical philosophy. All Patent and Non-Patent Literatures mentioned in this specification are incorporated by reference in its entirety.

DESCRIPTION OF REFERENCE NUMERALS

1, 1A, 1X Information processing device
2 (2A, 2B, . . . ) Terminal device
4 Storage device
100 Optimization system

What is claimed is:

1. An information processing device comprising:

at least one memory configured to store instructions; and at least one processor configured to execute the instructions to:

obtain, as an optimization problem, condition information indicating a plurality of constraint conditions associated with a plurality of variables, and an objective function indicating a function of the plurality of variables;

acquire constraint relaxation history information indicating a history relating to settings of relaxation of a constraint condition in the optimization problem, wherein the constraint relaxation history information includes records respectively indicating relaxed constraints for at least one of the plurality of constraint conditions, and a solution of the optimization problem according to the relaxed constraints;

display, on a display device, a graph structure including:

a constraint relaxation history tree in which each of the records of the constraint relaxation history information is represented by a node, and each of the nodes are connected into a tree structure according to a relationship of each of the records, wherein each of the nodes are selectable, and a table representing each of the records of the constraint relaxation history information corresponding to the displayed nodes;

while the graph structure is displayed, receive a request to generate a child node from a node selected as an origin point;

based on receiving the request to generate the child node, display, on the display device, a relaxation designation screen representing contents of a constraint condition for a record corresponding to the node selected as the origin point;

receive, from the relaxation designation screen, constraint relaxation designation information indicating a modification of the constraint condition for the record corresponding to the node selected as the origin node; and update the displayed graph structure to include, in the constraint relaxation history tree, the child node branching from the node selected as the origin point, and in the table representing each of the records of the constraint relaxation history, a new record indicating the constraint relaxation designation information for the child node.

2. The information processing device according to claim 1, wherein the at least one processor is configured to further execute the instructions to:

receive an input for specifying-selecting two nodes to be merged from the node and add a node to the graph structure obtained by merging the two nodes, upon receiving the input.

3. The information processing device according to claim 2, wherein the at least one processor is configured to execute the instructions to determine a constraint condition corresponding to the node added by the merge, based on a logical sum of constraint conditions corresponding to the two nodes.

4. The information processing device according to claim 1, wherein the at least one processor is configured to execute the instructions to receive an input relating to a type of the constraint condition to be relaxed, a relaxation range of the constraint condition, and the weight for a penalty when the constraint condition is relaxed, and generate the constraint relaxation history information relating to the second node based on the input.

5. The information processing device according to claim 1, wherein the at least one processor is configured to execute the instructions to:

receive an input for specifying two nodes to be compared among the nodes, and compare and display the settings corresponding to the two nodes on the display device, upon receiving the input.

6. The information processing device according to claim 1, wherein the at least one processor is configured to further execute the instructions to determine, when a node is added, a solution of the optimization problem based on the setting corresponding to the added node.

7. A control method executed by a computer, the control method comprising:

obtaining, as an optimization problem, condition information indicating a plurality of constraint conditions associated with a plurality of variables, and an objective function indicating a function of the plurality of variables;

acquiring constraint relaxation history information indicating a history relating to settings of relaxation of a constraint condition in the optimization problem, wherein the constraint relaxation history information includes records respectively indicating relaxed constraints for at least one of the plurality of constraint conditions, and a solution of the optimization problem according to the relaxed constraints;

displaying, on a display device, a graph structure including:

a constraint relaxation history tree in which each of the records of the constraint relaxation history information is represented by a node, and each of the nodes are connected into a tree structure according to a relationship of each of the records, wherein each of the nodes are selectable, and a table representing each of the records of the constraint relaxation history information corresponding to the displayed nodes;

while the graph structure is displayed, receiving a request to generate a child node from a node selected as an origin point;

based on receiving the request to generate the child node, displaying, on the display device, a relaxation designation screen representing contents of a constraint condition for a record corresponding to the node selected as the origin point;

receiving, from the relaxation designation screen, constraint relaxation designation information indicating a modification of the constraint condition for the record corresponding to the node selected as the origin node; and updating the displayed graph structure to include, in the constraint relaxation history tree, the child node branching from the node selected as the origin point, and in the table representing each of the records of the constraint relaxation history, a new record indicating the constraint relaxation designation information for the child node.

8. A non-transitory computer readable storage medium storing a program executed by a computer, the program causing the computer to:

obtain, as an optimization problem, condition information indicating a plurality of constraint conditions associated with a plurality of variables, and an objective function indicating a function of the plurality of variables;

acquire constraint relaxation history information indicating a history relating to settings of relaxation of a constraint condition in the optimization problem, wherein the constraint relaxation history information includes records respectively indicating relaxed constraints for at least one of the plurality of constraint conditions, and a solution of the optimization problem according to the relaxed constraints;

display, on a display device, a graph structure including:

a constraint relaxation history tree in which each of the records of the constraint relaxation history information is represented by a node, and each of the nodes are connected into a tree structure according to a relationship of each of the records, wherein each of the nodes are selectable, and a table representing each of the records of the constraint relaxation history information corresponding to the displayed nodes;

while the graph structure is displayed, receive a request to generate a child node from a node selected as an origin point;

based on receiving the request to generate the child node, display, on the display device, a relaxation designation screen representing contents of a constraint condition for a record corresponding to the node selected as the origin point;

receive, from the relaxation designation screen, constraint relaxation designation information indicating a modification of the constraint condition for the record corresponding to the node selected as the origin node; and update the displayed graph structure to include, in the constraint relaxation history tree, the child node branching from the node selected as the origin point, and in the table representing each of the records of the constraint relaxation history, a new record indicating the constraint relaxation designation information for the child node.

* * * * *